W. F. MULLANEY.
ADDING COUNTER.
APPLICATION FILED MAY 1, 1911.
1,035,629.
Patented Aug. 13, 1912.
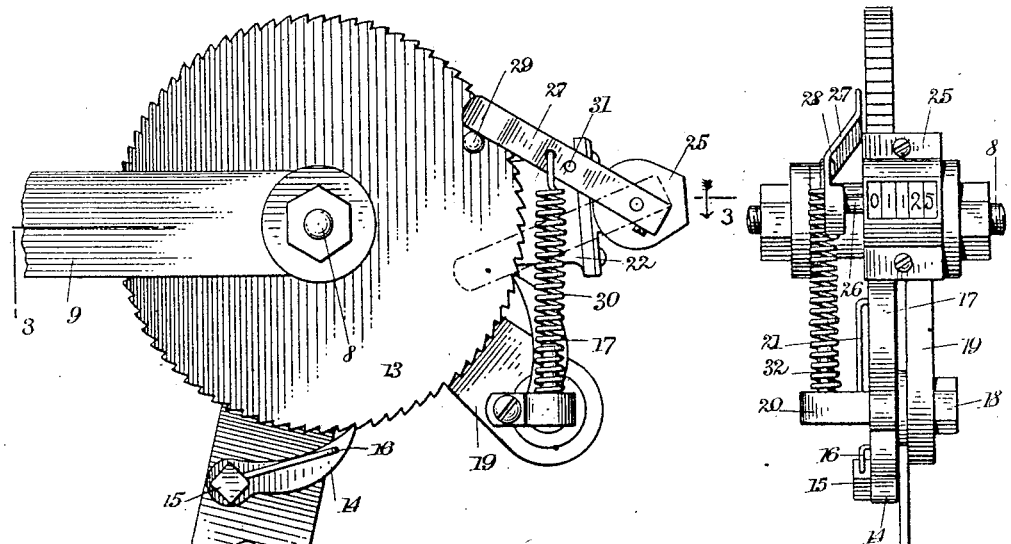
Fig. 1.    Fig. 2.
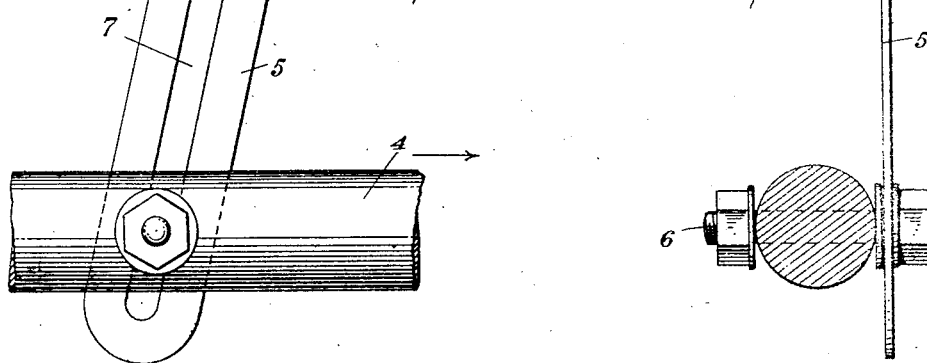
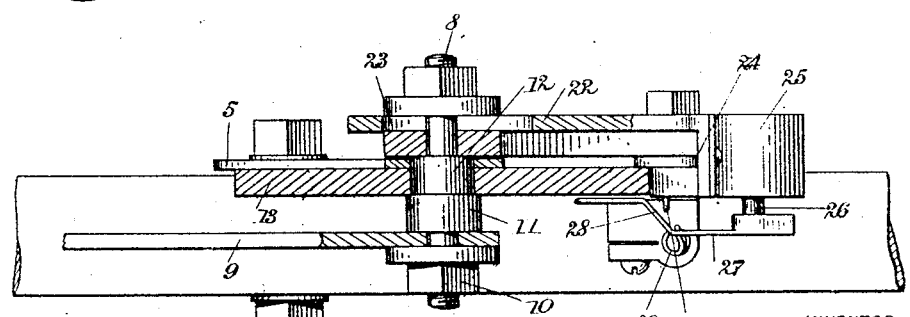
Fig. 3.
WITNESSES
George Bambay
W. S. Orton
INVENTOR
William F. Mullaney
BY Munn & Co
ATTORNEYS

UNITED STATES PATENT OFFICE.

WILLIAM FRANK MULLANEY, OF MARSHALL, MINNESOTA.

ADDING-COUNTER.

1,035,629.  Specification of Letters Patent.  Patented Aug. 13, 1912.

Application filed May 1, 1911. Serial No. 624,277.

*To all whom it may concern:*

Be it known that I, WILLIAM F. MULLANEY, a citizen of the United States, and a resident of Marshall, in the county of Lyon and State of Minnesota, have invented a new and Improved Adding-Counter, of which the following is a full, clear, and exact description.

My invention relates to a new and improved adding counter, and an object of my invention is to provide a device which will accurately measure the travel of a reciprocating element. In the counters now in common use, it is not possible to accurately measure the travel of a reciprocating body, such as a piston rod of a pump, due to the fact that the counter does not register until the entire stroke has been made.

A further object of my invention is to overcome the deficiencies common to the old form of counters, and to arrange an instrument which will measure the travel of the moving body irrespective of the length of the stroke and which will automatically add up the travel of the moving body.

I attain the above outlined objects by attaching to the reciprocating body, an arm which actuates a gear wheel each time the reciprocating body moves in one of its directions, and will carry the wheel around a distance proportionate to the travel of the reciprocating body in that direction. Every complete revolution of the gear wheel will actuate a meter, so that as the total number of revolutions are recorded and as the circumference of the gear wheels bears a definite ratio to the length of travel of the reciprocating member, the number of revolutions times the circumference of the wheel times the constant ratio between th radius of the wheel and the point of adjustment of the arm to the reciprocating body, will give the total travel of the reciprocating body from the time the registry was set.

With the above and other objects in view, as will more fully hereinafter appear, the present invent'n consists in certain novel details of construction and arrangement of parts hereinafter fully described, illustrated in the accompanying drawings, and more particularly pointed out in the appended claims.

Reference is to be had to the accompanying drawings, forming a part of this specification, in which similar characters of reference indicate corresponding parts in all the figures, and in which—

Figure 1 is a side elevation showing a preferred embodiment of my invention; Fig. 2 is an end view of the same looking from the right-hand side of Fig. 1; and Fig. 3 is a transverse sectional view taken on the line 3—3 of Fig. 1 and looking in the direction of the arrow.

Described more in detail, I have shown a reciprocating body in the form of a shaft 4, to which is pivotally connected a swinging arm 5, by means of a bolt 3 which passes through said reciprocating member 4 and is adjustably positioned in a slot 7 extending lengthwise through the arm 5. The upper end of the arm 5 is pivoted to a supporting shaft 8, which shaft is supported in any convenient manner by means of a bracket 9 bearing against which is a jam nut 10, and upon the opposite side of the bracket 9 from the nut 10 is a collar 11.

Mounted upon the shaft 8 adjacent the collar 11, is a collar 12; mounted upon which last-mentioned collar is a ratchet wheel 13, the teeth of which are engaged by a pawl 14 pivoted at 15 to the arm 5, and normally in spring-pressed engagement with the teeth of the ratchet 13. The ratchet 13 and the pawl 14 form a one-way pawl-and-ratchet connection, so that as the reciprocating body moves in the direction indicated by the arrow in Fig. 1, the ratchet wheel 13 will be moved anti-clockwise. When the shaft 4 has reached the limit of its movement in the direction of the arrow and begins to retreat, the pawl 14 of course runs back over the teeth of the ratchet 13. The ratchet itself is prevented from moving by being engaged by the pawl 17 disposed in the same direction as the pawl 14, which pawl 17 is carried on a shaft 18 extending at right angles from the outer end of an arm 19, the inner end of which arm is mounted on the shaft 8. Extending from the shaft 18 is a bracket 20, which bracket carries one end of a leaf spring 21, the other end of which is attached to the pawl 17, maintaining said pawl in engagement with the teeth on the ratchet 13. It will be seen that by this arrangement, the ratchet 13 is held from retarding as the reciprocating rod moves in the direction contra to the direction shown by the arrow in Fig. 1.

Mounted on the shaft 8 is a meter-carrying arm 22, which arm is slotted at 23 to adjustably position the same on the shaft 8. The arm 22 is of a general L-shaped form in cross section, to the small leg 24 of which is attached a meter 25 of any preferred construction. To the shaft 26 of the meter is attached one end of an actuating arm 27, which arm is offset, as shown at 28, to extend a short distance parallel to the outer edge of one side of the ratchet 13. Disposed on the side face of the ratchet 13 is a stud 29 adapted to engage the offset portion of the arm 27. As the ratchet is rotated, it will be seen that at each complete rotation of the ratchet 13, the stud 29 will actuate the arm 27, and thereby cause the meter 25 to register one point. In order to return the arm 27 to its normal position, as shown in dotted lines in Fig. 1, a tension spring 30 is provided, having one end thereof hooked into one of the recesses 31 in the arm 27 and having its other end telescoping a guiding stud 32 extending upward from the bracket 20. The lower end of the tension spring 30 is fastened to the bracket 20.

Many changes could be made in the above construction and many apparently widely different embodiments of this invention could be made without departing from the scope thereof. It is intended that all matters contained herein in the above description or shown in the accompanying drawings, shall be interpreted as illustrative and not in a limiting sense. It is also to be understood that the language used in the following claims is merely intended to cover all the generic and specific features of the invention herein described, and all statements of the scope of the invention, which, as a matter of language, might be said to fall therebetween, and that materials, sizes and relativities of parts are non-essential, except as called for in the claims.

Having thus described my invention, I claim as new and desire to secure by Letters Patent:

1. In an adding counter to measure the distance traveled by a reciprocating member, in combination, a shaft, a swinging arm pivoted to said shaft and pivotally connected to the reciprocating member, a ratchet freely revoluble on said shaft, a spring-pressed pawl pivoted to said arm, engaging said ratchet to actuate the latter in one direction, a pair of arms mounted on said shaft, one of said arms carrying a meter and the other of said arms carrying a spring-pressed pawl adapted to engage the ratchet to hold the same after it has been fed by the pawl on the swinging arm, an arm actuating said meter and extending adjacent to and at one side of said ratchet, a tension spring having one end attached to said meter-actuating arm and having the other end attached to said pawl-carrying arm, and a stud in line with said meter-actuating arm.

2. In an adding counter to measure the distance traveled by a reciprocating member, in combination a reciprocating member, a shaft, a swinging arm pivoted to said shaft and pivotally connected to the reciprocating member, a ratchet freely revoluble on said shaft, a spring-pressed pawl pivoted to said arm, engaging said ratchet to actuate the latter in one direction, a pair of arms mounted on said shaft, one of said arms carrying a meter and the other of said arms carrying a spring-pressed pawl adapted to engage the ratchet to hold the same after it has been fed by the pawl on the swinging arm, an arm actuating said meter and extending adjacent to and at one side of said ratchet, a tension spring having one end attached to said meter-actuating arm and having the other end attached to said pawl-carrying arm, a stud in line with said meter-actuating arm, and means locking said arms in angular relation to each other to vary the tension of said spring.

In testimony whereof I have signed my name to this specification in the presence of two subscribing witnesses.

WILLIAM FRANK MULLANEY.

Witnesses:
I. K. CASEY,
W. R. CURTIS.